(12) United States Patent
Cremers

(10) Patent No.: US 7,873,185 B2
(45) Date of Patent: Jan. 18, 2011

(54) METHOD FOR DETECTION AND TRACKING OF DEFORMABLE OBJECTS

(75) Inventor: Daniel Cremers, Bonn (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 923 days.

(21) Appl. No.: 11/481,127

(22) Filed: Jul. 5, 2006

(65) Prior Publication Data

US 2007/0031003 A1    Feb. 8, 2007

Related U.S. Application Data

(60) Provisional application No. 60/705,061, filed on Aug. 3, 2005.

(51) Int. Cl.
*G06K 9/00*    (2006.01)
(52) U.S. Cl. .................. 382/103; 382/100; 382/107; 382/170; 382/181; 382/209; 348/143; 348/152; 348/169
(58) Field of Classification Search ............... 382/100, 382/103, 107, 164, 165, 168, 170–172, 173, 382/181, 199, 203, 215, 254, 266; 348/169–172, 348/152–155, 143
See application file for complete search history.

(56) References Cited

U.S. PATENT DOCUMENTS

| | | | | |
|---|---|---|---|---|
| 5,960,111 | A * | 9/1999 | Chen et al. | 382/173 |
| 7,095,890 | B2 * | 8/2006 | Paragios et al. | 382/173 |
| 7,728,839 | B2 * | 6/2010 | Yang et al. | 345/474 |
| 2004/0019467 | A1 * | 1/2004 | Paragios et al. | 703/2 |
| 2005/0169533 | A1 * | 8/2005 | Paragyios | 382/203 |

OTHER PUBLICATIONS

Cremers et al. (Kernel Density Estimation and Intrinsic Alignment for Knowledge-driven Segmentation: Teaching Level Sets to Walk, Sep. 2004, Springer, Pattern Recognition LNCS, vol. 3775, pp. 36-44).*
Cremers et al. (Statistical shape knowledge in variational motion segmentation, 2003, Elsevier, Image and Vision Computing, vol. 21, pp. 77-86).*
Han et al. (A Topology Preserving Deformable Model Using Level Sets, 2001, Proc. IEEE Conf. Computer Vision and Pattern Recognition, pp. 765-770).*
Paragios et al. (Geodesic Active Contours and Level Sets for the Detection and Tracking of Moving Objects, Mar. 2000, IEEE Transactions on Pattern Analysis and Machine Intelligence, vol. 22, No. 3, pp. 266-280).*
Paragios et al. (Geodesic Active Regions for Supervised Texture Segmentation, 1999, IEEE, pp. 926-932).*
Umeyama, Contour extraction using a complex autoregressive model, 1998, Systems and Computers in Japan, vol. 28 Issue 1, pp. 66-73.*
Agarwal et al. "Tracking Articulated Motion Using a Mixture of Autoregressive Models", Computer Vision—ECCV 2004, pp. 54-65, May 10, 2004.*

* cited by examiner

*Primary Examiner*—Sath V Perungavoor
*Assistant Examiner*—Jason Heidemann
(74) *Attorney, Agent, or Firm*—Donald B. Paschburg

(57) ABSTRACT

A method for detecting and tracking a deformable object having a sequentially changing behavior, comprising: developing a temporal statistical shape model of the oscillatory behavior of the embedding function representing the object from prior motion; and then applying the model against future, sequential motion of the object in the presence of unwanted phenomena by maximizing the probability that the developed statistical shape model matches the sequential motion of the object in the presence of unwanted phenomena.

3 Claims, 11 Drawing Sheets

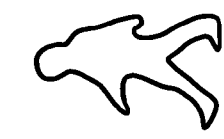
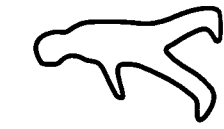
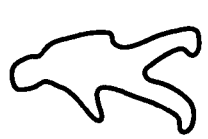
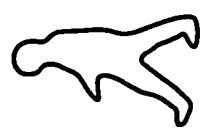
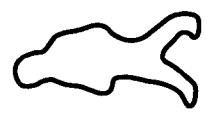

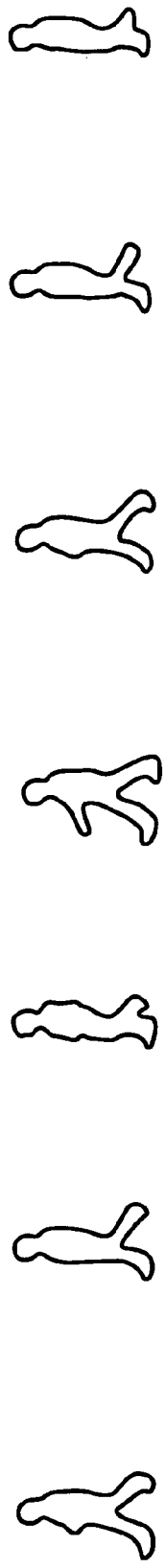
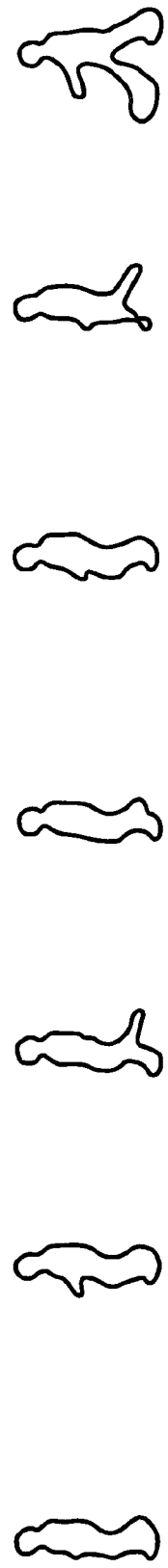

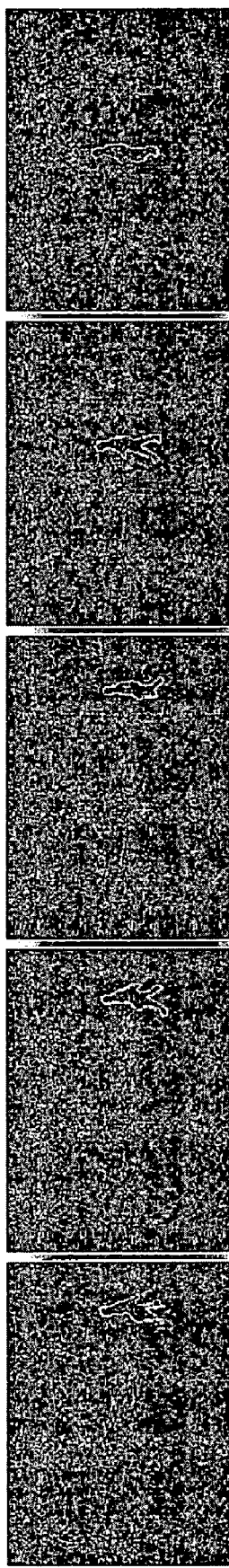
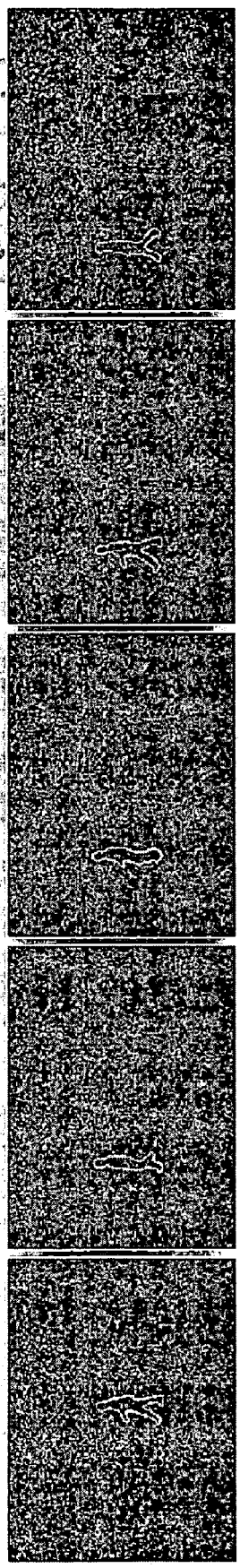

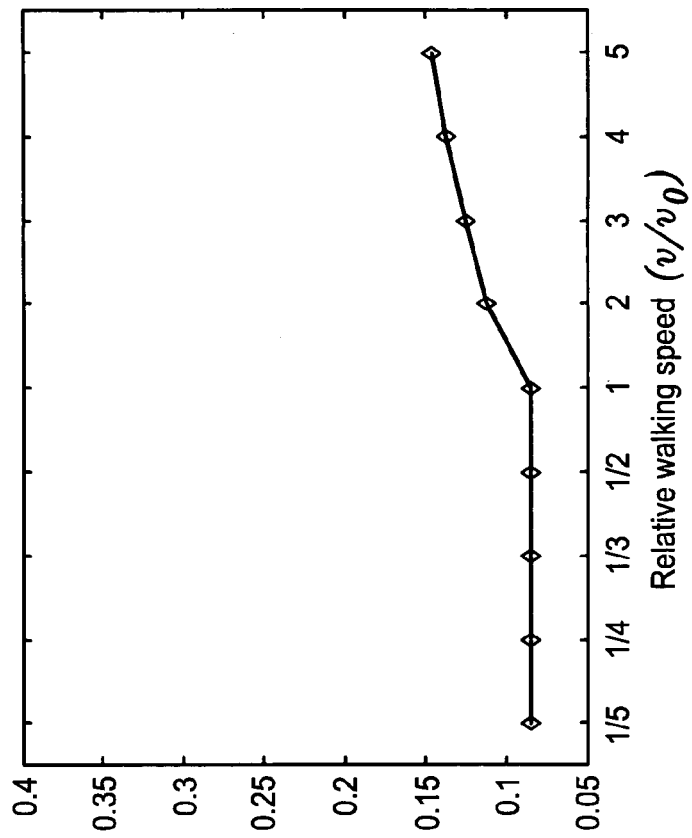
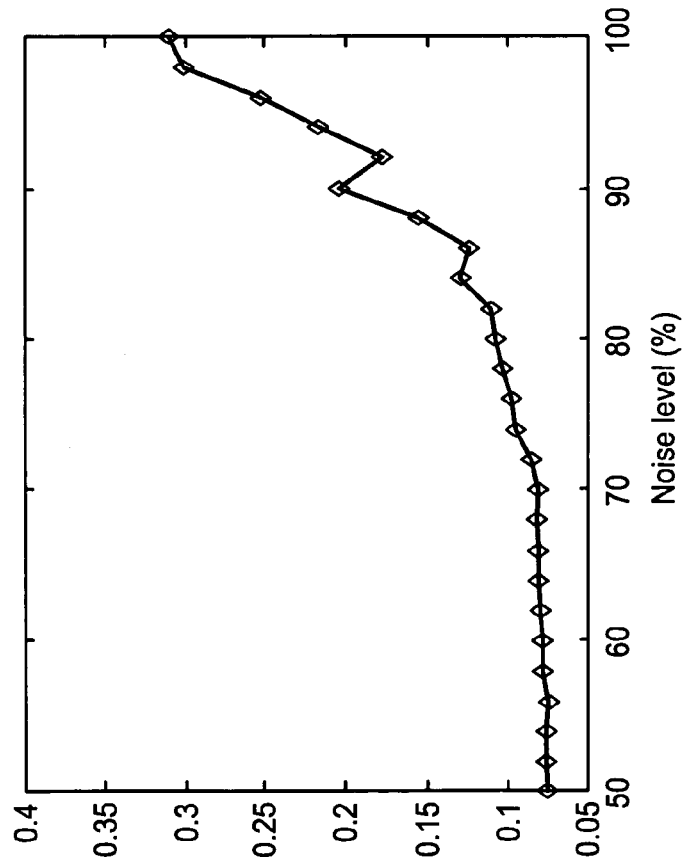
FIG. 11A
FIG. 11B

Segmentation with a dynamical prior of joint deformation and transformation.

Segmentation with a dynamical prior on the deformation only.

METHOD FOR DETECTION AND TRACKING OF DEFORMABLE OBJECTS

CROSS REFERENCE TO RELATED APPLICATION

This application claims priority from U.S. Provisional application No. 60/705,061 filed Aug. 3, 2005, which is incorporated herein by reference.

TECHNICAL FIELD

This invention relates generally to object detection and more particularly to the detection and tracking of deformable objects.

BACKGROUND AND SUMMARY

As is known in the art, it is frequently desirable to detect and segment an object from a background of other objects and/or from a background of noise. One application, for example, is in MRI where it is desired to segment an anatomical feature of a human patient, such as, for example, a vertebra of the patent. In other cases it would be desirable to segment a moving, deformable anatomical feature such as the heart.

In 1988, Osher and Sethian, in a paper entitled "Fronts propagation with curvature dependent speed: Algorithms based on Hamilton-Jacobi formulations" *J. of Comp. Phys.*, 79:12-49, 1988, introduced the level set method, it being noted that a precursor of the level set method was proposed by Dervieux and Thomasset in a paper entitled "A finite element method for the simulation of Raleigh-Taylor instability". *Springer Lect. Notes in Math.*, 771:145-158, 1979, as a means to implicitly propagate hypersurfaces C(t) in a domain $\Omega \subset R^n$ by evolving an appropriate embedding function $\phi: \Omega \times [0,T] \to R$, where:

$$C(t) = \{x \in \Omega | \phi(x,t) = 0\}. \quad (1)$$

More generally, an embedding function is a real-valued height function \phi(x) defined at each point x of the image plane, such that the contour C corresponds to all points x in the plane where \phi(x)=0:

$$C = \{x | \text{\phi}(x) = 0\}$$

This is a way to represent a contour C implicitly. Rather than working with a contour C (moving the contour etc), one works with the function \phi. Moving the values of \phi will implicitly move the "embedded" contour. This is why \phi(x) is called an "embedding function"—it embeds the contour as its zero-level or isoline to value 0.

The ordinary differential equation propagating explicit boundary points is thus replaced by a partial differential equation modeling the evolution of a higher-dimensional embedding function. The key advantages of this approach are well-known: Firstly, the implicit boundary representation does not depend on a specific parameterization, during the propagation no control point regridding mechanisms need to be introduced. Secondly, evolving the embedding function allows to elegantly model topological changes such as splitting and merging of the embedded boundary. In the context of shape modeling and statistical learning of shapes, the latter property allows to construct shape dissimilarity measures defined on the embedding functions which can handle shapes of varying topology. Thirdly, the implicit representation, equation (1), naturally generalizes to hypersurfaces in three or more dimensions. To impose a unique correspondence between a contour and its embedding function one can constrain $\phi$ to be a signed distance function, i.e. $|\nabla\phi|=1$ almost everywhere.

The first applications of the level set method to image segmentation were pioneered in the early 90's by Malladi et al. in a paper entitled "A finite element method for the simulation of Raleigh-Taylor instability: *Springer Lect. Notes in Math.*, 771:145-158, 1979, by Caselles et al. in a paper entitled "Geodesic active contour." In *Proc. IEEE Intl. Conf. on Comp. Vis.*, pages 694-699, Boston, USA, 1995, by Kichenassamy et al. in a paper entitled "Gradient flows and geometric active contour models": In *IEEE Intl. Conf. on Comp. Vis.*, pages 810-815, 1995 and by Paragios and Deriche in a paper entitled "Geodesic active regions and level set methods for supervised texture segmentation": *Int. J. of Computer Vision*, 46(3): 223-247, 2002. Level set implementations of the Mumford-Shah functional, see paper entitled: "Optimal approximations by piecewise smooth functions and associated variational problems": *Comm. Pure Appl. Math.*, 42:577-685, 1989 [14] were independently proposed by Chan and Vese, see paper entitled "Active contours without edges": *IEEE Trans. Image Processing*, 10(2):266-277, 2001 and by Tsai et al. in a paper entitled "Model-based curve evolution technique for image segmentation": In *Comp. Vision Patt. Recog.*, pages 463-468, Kauai, Hawaii, 2001.

In recent years, researchers have proposed to introduce statistical shape knowledge into level set based segmentation methods in order to cope with insufficient low-level information. While these priors were shown to drastically improve the segmentation of familiar objects, so far the focus has been on statistical shape priors (i.e., what are "priors") which are static in time. Yet, in the context of tracking deformable objects, it is clear that certain silhouettes (such as those of the beating human in an MRI application, or of a walking person in another application) may become more or less likely over time. Leventon et al. in a paper entitled "Geometry and prior-based segmentation: In T. Pajdla and V. Hlavac, editors, *European Conf. on Computer Vision*, volume 3024 of *LNCS*, pages 50-61, Prague, 2004. Springer, proposed to model the embedding function by principal component analysis (PCA) of a set of training shapes and to add appropriate driving terms to the level set evolution equation, Tsai et al. in a paper entitled "Curve evolution implementation of the Mumford-Shah functional for image segmentation, de-noising, interpolation, and magnification" *IEEE Trans. on Image Processing*, 10(8): 1169-1186, 2001 suggested performing optimization directly within the subspace of the first few eigenmodes. Rousson et al. see "Shape priors for level set representations": In A. Heyden et al., editors, *Proc. of the Europ. Conf. on Comp. Vis.*, volume 2351 of *LNCS*, pages 78-92, Copenhagen, May 2002. Springer, Berlin. and "Implicit active shape models for 3d segmentation in MRI imaging": In *MICCAI*, pages 209-216, 2004 suggested introduction of shape information on the variational level, while Chen et al., see "Using shape priors in geometric active contours in a variational framework": *Int. J. of Computer Vision*, 50(3):315-328, 2002 imposed shape constraints directly on the contour given by the zero level of the embedding function. More recently, Riklin-Raviv et al. see *European Conf. on Computer Vision*, volume 3024 of *LNCS*, pages 50-61, Prague, 2004. Springer, proposed to introduce projective invariance by slicing the signed distance function at various angles.

In the above works, statistically learned shape information was shown to cope for missing or misleading information in the input images due to noise, clutter and occlusion. The shape priors were developed to segment objects of familiar shape in a given image. However, although they can be applied to tracking objects in image sequences see [Cremers et al., "Nonlinear shape statistics in Mumford-Shah based segmentation": In A. Heyden et al., editors, *Europ. Conf. on Comp. Vis.*, volume 2351 of *LNCS*, pages 93-108, Copenhagen, May 2002. Springer], [Moelich and Chan, "Tracking objects with the Chan-Vese algorithm", Technical Report 03-14, Computational Applied Mathematics, UCLA, Los Angeles, 2003] and [Cremers et al., "Kernel density estimation and intrinsic alignment for knowledge-driven segmentation": Teaching level sets to walk. In *Pattern Recognition*, volume 3175 of *LNCS*, pages 36-44. Springer, 2004], they are not well suited for this task, because they neglect the temporal coherence of silhouettes which characterizes many deforming shapes.

When tracking a three-dimensional deformable object over time, clearly not all shapes are equally likely at a given time instance. Regularly sampled images of a walking person, for example, exhibit a typical pattern of consecutive silhouettes. Similarly, the projections of a rigid 3D object rotating at constant speed are generally not independent samples from a statistical shape distribution. Instead, the resulting set of silhouettes can be expected to contain strong temporal correlations.

In accordance with the present invention, a method us provided for detecting and tracking a deformable object having an sequentially changing behavior wherein the method develops a temporal statistical shape model of the sequentially changing behavior of the embedding function representing the object from prior motion and then applies the model against future, sequential motion of the object in the presence of unwanted phenomena by maximizing the probability that the developed statistical shape model matches the sequential motion of the object in the presence of unwanted phenomena.

In accordance with another feature of the invention, a method generates a dynamical model of the time-evolution of the embedding function of prior observations of a boundary shape of an object, such object having an observable, sequentially changing boundary shape; and subsequently using such model for probabilistic inference about such shape of the object in the future.

The method develops temporal statistical shape models for implicitly represented shapes of the object. In particular, the shape probability at a given time depends is a function of the shapes of the object observed at previous times.

In one embodiment, the dynamical shape models are integrated into a segmentation process within a Bayesian framework for level set based image sequence segmentation.

In one embodiment, optimization is obtained by a partial differential equation for the level set function. The optimization includes evolution of an interface which is driven both by the intensity information of a current image as well as by a prior dynamical shape which relies on the segmentations obtained on the preceding frames.

With such method, in contrast to existing approaches to segmentation with statistical shape priors, the resulting segmentations are not only similar to previously learned shapes, but they are also consistent with the temporal correlations estimated from sample sequences. The resulting segmentation process can cope with large amounts of noise and occlusion because it exploits prior knowledge about temporal shape consistency and because it aggregates information from the input images over time (rather than treating each image independently).

The development of dynamical models for implicitly represented shapes and their integration into image sequence segmentation on the basis of the Bayesian framework draws on much prior work in various fields. The theory of dynamical systems and time series analysis has a long tradition in the literature (see for example [A. Papoulis, *Probability, Random Variables, and Stochastic Processes*, McGraw-Hill, New York, 1984]). Autoregressive models were developed for explicit shape representations among others by Blake, Isard and coworkers [A. Blake and M. Isard. *Active Contours*. Springer, London, 1998]. In these works, successful tracking results were obtained by particle filtering based on edge-information extracted from the intensity images. Here, however, the method of the present invention, differs from these in three ways:

Here the dynamical models are for implicitly represented shapes. As a consequence, the dynamical shape model can automatically handle shapes of varying topology. The model trivially extends to higher dimensions (e.g. 3D shapes), since it does not need to deal with the combinatorial problem of determining point correspondences and issues of control point re-gridding associated with explicit shape representations.

The method according to the present invention, integrates the intensity information of the input images in a statistical formulation inspired by [Zhu, Yuille 1996, Chan, Vese 1999]. This leads to a region-based tracking scheme rather than an edge-based one. The statistical formulation implies that—with respect to the assumed intensity models—the method optimally exploits the input information. It does not rely on a pre-computation of heuristically defined image edge features. Yet, the assumed probabilistic intensity models are quite simple (namely Gaussian distributions). More sophisticated models for intensity, color or texture of objects and background could be employed.

The Bayesian aposteriori optimization is solved in a variational setting by gradient descent rather than by stochastic sampling techniques. While this limits the algorithms used by the invention to only track the most likely hypothesis (rather than multiple hypotheses), it facilitates an extension to higher-dimensional shape representations without the drastic increase in computational complexity inherent to sampling methods.

Recently, Goldenberg et al. [Goldenberg, Kimmel, Rivlin, and Rudzsky, *Pattern Recognition*, 38:1033-1043, July 2005.] successfully applied PCA to an aligned shape sequence to classify the behavior of periodic shape motion. Though this work is also focused on characterizing moving implicitly represented shapes, it differs from the present invention in that shapes are not represented by the level set embedding function (but rather by a binary mask), it does not make use of autoregressive models, and it is focused on behavior classification of pre-segmented shape sequences rather than segmentation or tracking with dynamical shape priors.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 1A-1L, collectively hereinafter referred to as FIG. 1, shows a low-dimensional approximation of a set of training silhouettes, the silhouettes on the top are hand segmented and the bottom silhouettes are approximated by PCA of their embedding functions in accordance with the invention;

FIGS. 4A-4N, collectively hereinafter referred to as FIG. 4, are walking sequence generated by the process according to the invention, sample silhouettes being generated by a statistically learned second order Markov model on the embedding functions;

FIGS. 5A-5D, collectively hereinafter referred to as FIG. 5, shows samples from an image sequence with increasing amounts of noise.

FIGS. 10A-10J, collectively hereinafter referred to as FIG. 10, shows tracking according to the invention with dynamical shape prior for 90% of noise;

FIGS. 11A and 11B, collectively hereinafter referred to as FIG. 11 shows quantitative evaluation of the segmentation accuracy according to the invention.

Like reference symbols in the various drawings indicate like elements.

DETAILED DESCRIPTION

Figure 13:
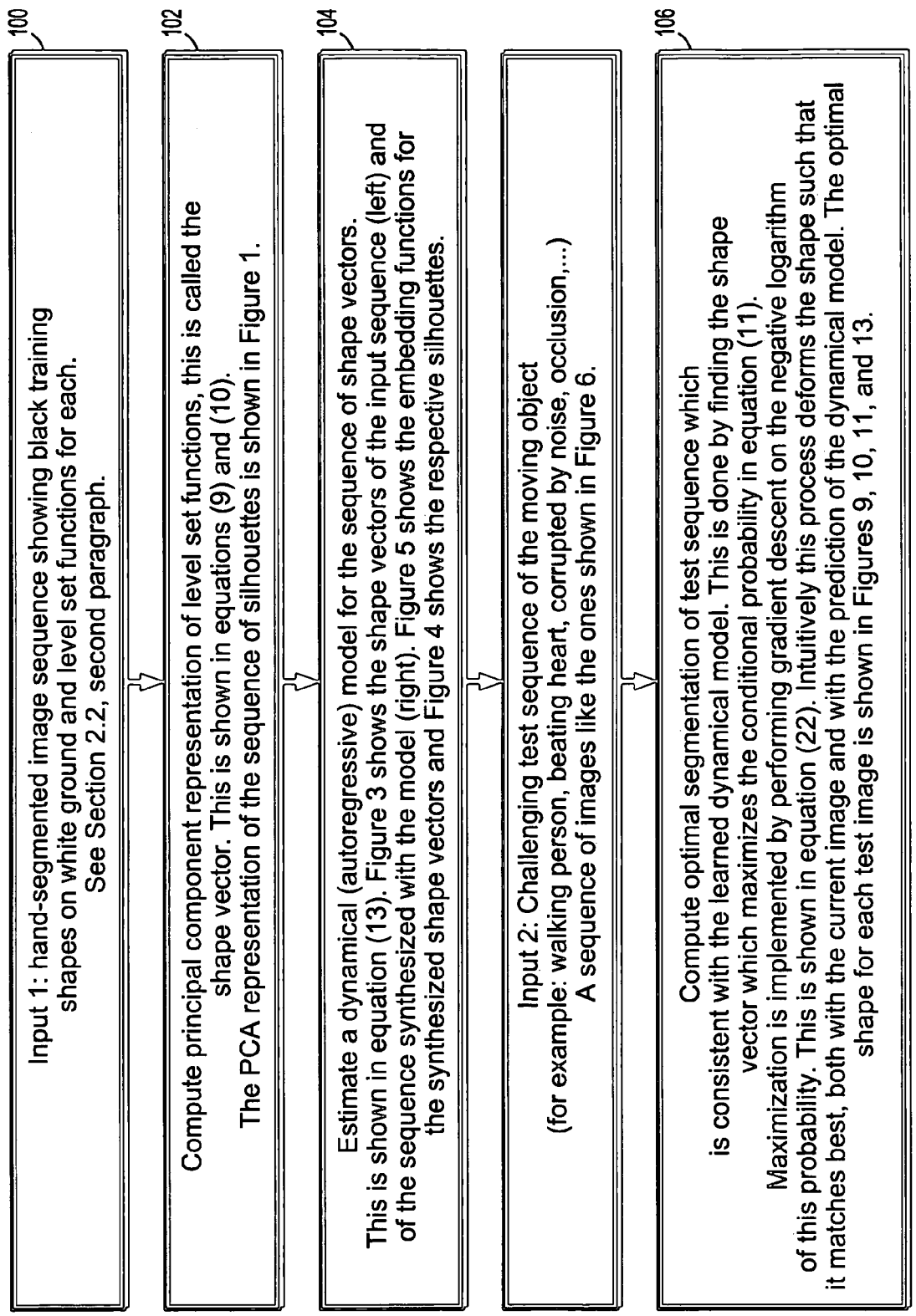
FIG. 13 is a flow diagram of the process according to the invention.
Figure 14C:
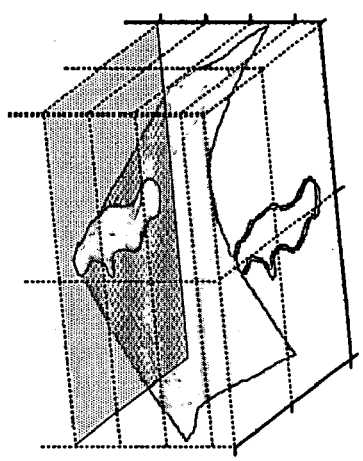
FIGS. 14A-14F, collectively hereinafter referred to as FIG. 14, are statistically generated embedding surfaces obtained by sampling from a second order autoregressive model according to the invention, and the contours given by the zero level lines of the synthesized surfaces. The implicit formulation allows the embedded contour to change topology (bottom left image).
Figure 14F:
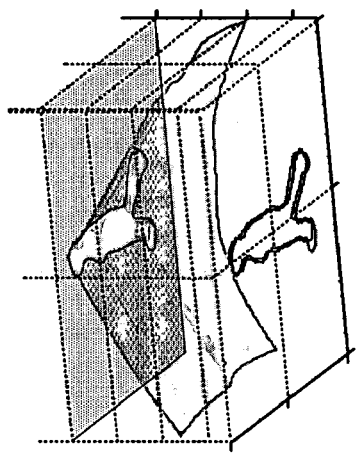
Figure 14B:
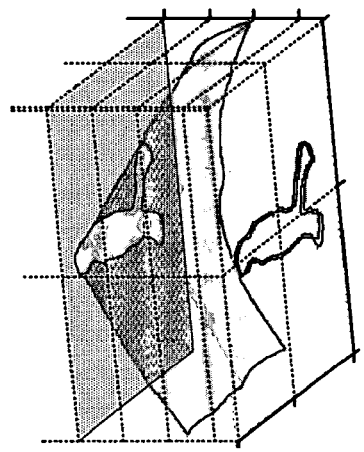
Figure 14E:
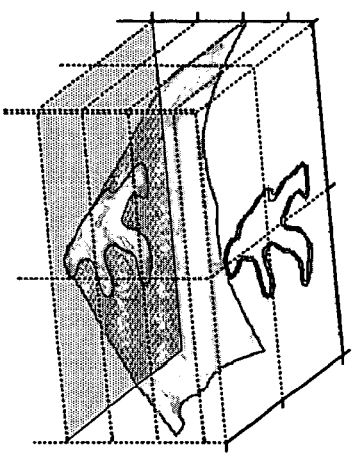
Figure 14A:
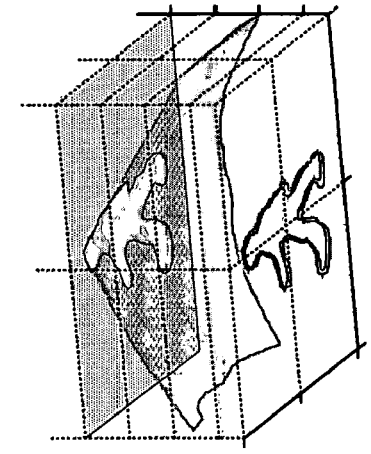
Figure 14D:
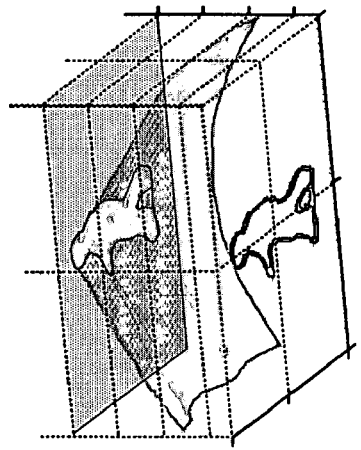

Referring now to FIG. 13, a flow diagram is shown of a method for detection and tracking of deformable objects. Here, to illustrate an example of the method, the object is a walking person. It should be understood, however, that the method applies to other deformable objects including anatomical objects such as the beating human heart.

Before discussing the steps in FIG. 13, a Bayesian formulation for level set based image sequence segmentation will be introduced. First, the general formulation in the space of embedding functions will be discussed and subsequently describe a computationally efficient formulation in a low-dimensional subspace.

2.1. General Formulation

In the following, a shape is defined as a set of closed 2D contours modulo a certain transformation group, the elements of which are denoted by $T_\theta$ with a parameter vector $\theta$. Depending on the application, these may be rigid-body transformations, similarity or affine transformations or larger transformation groups. The shape is represented implicitly by an embedding function $\phi$ according to equation (1). Thus objects of interest will be given by $\phi(T_\theta x)$, where the transformation $T_\theta$ acts on the grid, leading to corresponding transformations of the implicitly represented contour. Here, the shape $\phi$ is purposely separated from the transformation parameters $\theta$ since one may want to use different models to represent and learn their respective temporal evolution.

Assume there are given consecutive images $I_t: \Omega \to R$ from an image sequence, where $I_{1:t}$ denotes the set of images $\{I_1, I_1, \ldots, I_t\}$ at different time instances. Using the Bayesian formula (with all expressions conditioned on $I_{1:t-1}$), the problem of segmenting the current frame $I_t$ can then be addressed by maximizing the conditional probability $$P(\phi_t, \theta_t | I_{1:t}) = \frac{P(I_t | \phi_t, \theta_t, I_{1:t-1}) P(\phi_t, \theta_t | I_{1:t-1})}{P(I_t | I_{1:t-1})}, \quad (2)$$

with respect to the embedding function $\phi_t$ and the transformation parameters $\theta_t$. (Modeling probability distributions on infinite-dimensional spaces is in general an open problem, including issues of defining appropriate measures and of integrability. Therefore the functions $\phi$ may be thought of as finite-dimensional approximations obtained by sampling the embedding functions on a regular grid). For the sake of brevity, the philosophical interpretation of the Bayesian approach will not be discussed. Suffice it to say here that that the Bayesian framework can be seen as an inversion of the image formation process in a probabilistic setting.

The denominator in equation (2) does not depend on the estimated quantities and can therefore be neglected in the maximization. Moreover, the second term in the numerator can be rewritten using the Chapman-Kolmogorov [A. Papoulis, *Probability, Random Variables, and Stochastic Processes*, McGraw-Hill, New York, 1984] equation:

$$P(\phi_t, \theta_t | I_{1:t-1}) = \int P(\phi_t, \theta_t | \phi_{1:t-1}, \theta_{1:t-1}) P(\phi_{1:t-1}, \theta_{1:t-1} | I_{1:t-1}) d\phi_{1:t-1} d\theta_{1:t-1} \quad (3)$$

In the following, several assumptions are made which are aimed at simplifying expression in equation (2), leading to a computationally more feasible estimation problem:

It is assumed that the images $I_{1:t}$ are mutually independent:

$$P(I_t | \phi_t, \theta_t, I_{1:t-1}) = P(I_t | \phi_t, \theta_t). \quad (4)$$

It is assumed that the intensities of the shape of interest and of the background are independent samples from two Gaussian distributions with unknown means $\mu_1$, $\mu_2$ and variances $\sigma_1$, $\sigma_2$. As a consequence, the data term above can be written as:

$$P(I_t | \phi_t, \theta_t) = \prod_{\substack{x \\ \phi_t(T_{\theta_t} x) \geq 0}} \frac{1}{\sqrt{2\pi}\, \sigma_1}$$

-continued $$\exp\left(-\frac{(I_t(x)-\mu_1)^2}{2\sigma_1^2}\right)\prod_{\phi_t(T_{\theta_t}x)<0}\frac{1}{\sqrt{2\pi}\,\sigma_2}\exp\left(-\frac{(I_t(x)-\mu_2)^2}{2\sigma_2^2}\right)\propto$$

$$\exp\left(-\int_\Omega\left(\frac{(I_t-\mu_1)^2}{2\sigma_1^2}+\log\sigma_1\right)H\phi_t(T_{\theta_t}x)+\right.$$

$$\left.\left(\frac{(I_t-\mu_2)^2}{2\sigma_2^2}+\log\sigma_2\right)(1-H\phi_t(T_{\theta_t}x))dx\right),$$

where the Heaviside step function $H\phi \equiv H(\phi)$ is introduced to denote the areas where $\phi$ is positive ($H\phi=1$) or negative ($H\phi=0$). Related intensity models have been proposed among others, see D. Mumford and J. Shah "Optimal approximations by piecewise smooth functions and associated variational problems": *Comm. Pure Appl. Math.*, 42:577-685, 1989, S. C. Zhu and A. Yuille, "Region competition: Unifying snakes, region growing", and Bayes, "MDL for multiband image segmentation": *IEEE PAMI*, 18(9):884-900, 1996, and T. F. Chan and L. A. Vese "Active contours without edges": *IEEE Trans. Image Processing*, 10(2):266-277, 2001. The model parameters $\mu_i$ and $\sigma_i$ are estimated jointly with the shape $\phi_t$ and the transformation $\theta_t$. Their optimal values are given by the means and variances of the intensity $I_t$ inside and outside the current shape:

$$\mu_1 = \frac{1}{a_1}\int I_t H\phi_t dx, \qquad (5)$$

$$\sigma_1^2 = \frac{1}{a_1}\int I_t^2 H\phi_t dx - \mu_1^2,$$

$$\text{where } a_1 = \int H\phi_t dx,$$

and similarly for $\mu_2$ and $\sigma_2$ with $H\phi_t$ replaced by $(1-H\phi_t)$. To keep the notation simple, these parameters are not displayed as part of the dynamic variables.

To avoid the computational burden of considering all possible intermediate shapes $\phi_{1:t-1}$ and transformations $\theta_{1:t-1}$ in equation (3), it is assumed the distributions of previous states to be strongly peaked around the maxima of the respective distributions:

$$P(\phi_{1:t-1},\theta_{1:t-1}|I_{1:t-1})\approx\delta(\phi_{1:t-1}-\hat{\phi}_{1:t-1})\delta(\theta_{1:t-1}-\hat{\theta}_{1:t-1}), \qquad (6)$$

where $(\hat{\phi}_i, \hat{\theta}_i)=\mathrm{argmax}P(\phi_i, \theta_i|I_{1:t-1})$ are the estimates of shape and transformation obtained for the past frames, and $\delta(\cdot)$ denotes the Dirac delta function. An alternative justification for this approximation is the following: Assume that due to memory limitations, the tracking system cannot store the acquired images, but that it merely stores the past estimates of shape and transformation. Then the inference problem at time t reduces to that of maximizing the conditional distribution $$P(\phi_t,\theta_t|I_t,\hat{\phi}_{1:t-1},\hat{\theta}_{1:t-1})\propto P(I_t|\phi_t,\theta_t)P(\phi_t,\theta_t|\hat{\phi}_{1:t-1},\hat{\theta}_{1:t-1}) \qquad (7)$$

with respect to the embedding function $\phi_t$ and the transformation parameters $\theta_t$. This is equivalent to the original inference problem see equation (2) subject to the approximation see equation (6).

A central contribution of this paper is to model the joint prior on shape $\phi_t$ and transformation $\theta_t$ conditioned on previous shapes and transformations. To this end, two approximations are considered:

In a first step, it is assumes that shape and transformation are mutually independent, i.e. $P(\phi_t,\theta_t|\phi_{1:t-1},\theta_{1:t-1})=P(\phi_t|\phi_{1:t-1})P(\theta_t|\theta_{1:t-1})$, and assume a uniform prior on the transformation parameters, i.e. $P(\theta_t,\theta_{1:t-1})=\mathrm{const}$. This is complimentary to the recent work of Rathi et al., see Y. Rathi, N. Vaswani, A. Tannenbaum, and A. Yezzi. Particle filtering for geometric active contours and application to tracking deforming objects. In *IEEE Int. Conf. on Comp. Vision and Patt. Recognition*, 2005 who proposed a temporal model for these transformation parameters, while not imposing any specific model on the shape.

In a second step, the more general case of a joint distribution $P(\phi_t,\theta_t|\phi_{1:t-1},\theta_{1:t-1})$ of shape and transformation parameters is considered, taking into account couplings between shape and transformation. Experimental results demonstrate that this leads to superior performance in dealing with occlusions.

2.2 A Finite-Dimensional Formulation

When estimating the conditional probability $P(\phi_t,\theta_t|\hat{\phi}_{1:t-1},\hat{\theta}_{1:t-1})$ in (7) from sample data, one needs to revert to finite-dimensional approximations of the embedding function. It is well known that statistical models can be estimated more reliably if the dimensionality of the model and the data are low. The Bayesian inference is then recast in a low-dimensional formulation within the subspace spanned by the largest principal eigenmodes of a set of sample shapes. Training sequence is then exploited in a twofold way: Firstly, it serves to define a low-dimensional subspace in which to perform estimation. And secondly, within this subspace the process uses it to learn dynamical models for implicit shapes.

Let $\{\phi_1,\ldots,\phi_N\}$ be a temporal sequence of training shapes. It is assumed that all training shapes $\phi_i$ are signed distance functions. Yet an arbitrary linear combination of eigenmodes will in general not generate a signed distance function. While the proposed statistical shape models favor shapes which are close to the training shapes (and therefore close to the set of signed distance functions), not all shapes sampled in the considered subspace will correspond to signed distance functions. Let $\phi_0$ denote the mean shape and $\psi_1,\ldots,\psi_n$ the n largest eigenmodes with $n\ll N$. The process then approximates each training shape as:

$$\phi_i(x) = \phi_0(x) + \sum_{j=1}^n \alpha_{ij}\psi_j(x), \qquad (8)$$

where $$\alpha_{ij} = (\phi_i-\phi_0, \psi_j) \equiv \int(\phi_i-\phi_0)\psi_j dx. \qquad (9)$$

Such PCA based representations of level set functions have been successfully applied for the construction of statistical shape priors in see M. Leventon, W. Grimson, and O. Faugeras. Statistical shape influence in geodesic active contours. In *CVPR*, volume 1, pages 316-323, Hilton Head Island, S.C., 2000, A. Tsai, A. Yezzi, W. Wells, C. Tempany, D. Tucker, A. Fan, E. Grimson, and A. Willsky. Model-based curve evolution technique for image segmentation. In *Comp. Vision Patt. Recog.*, pages 463-468, Kauai, Hawaii, 2001, M. Rousson, N. Paragios, and R. Deriche. Implicit active shape models for 3d segmentation in MRI imaging. In *MICCAI*, pages 209-216, 2004 and M. Rousson and D. Cremers (M. Rousson and D. Cremers. *MICCAI*, volume 1, pages 757-764, 2005.).

Efficient kernel density estimation of shape and intensity priors for level set segmentation. In *MICCAI*, 2005. In the following, the vector of the first n eigenmodes will be denoted as $\psi=(\psi_1,\ldots,\psi_n)$. Each sample shape $\phi_i$ is therefore approximated by the n-dimensional shape vector $\alpha_i=(\alpha_{i1},\ldots,\alpha_{in})$. Similarly, an arbitrary shape $\phi$ can be approximated by a shape vector of the form $$\alpha_\phi=(\phi-\phi_0,\psi). \tag{10}$$

FIG. 1 shows a set of silhouettes from a sequence of a walking person and their approximation by the first 6 eigenmodes. While this approximation is certainly a rough approximation lacking some of the details of the shape, it was found sufficiently. More particularly, the sequence of six silhouettes in the top half of FIG. 1 are from hand tracings according to Step 100 of FIG. 13 and the six silhouettes in the lower half of FIG. 1 are PCA approximations as in Step 102 of FIG. 13. Thus, FIG. 1 shows a low-dimensional approximation of a set of training silhouettes. The silhouettes (top of FIG. 1) hand segmented in accordance with Step 100, FIG. 13, are the bottom silhouettes are approximated by the first 6 principal components (PCA) of their embedding functions (bottom of FIG. 1)—see equation (8)

In analogy to the derivation presented in the previous section, the goal of image sequence segmentation within this subspace can then be stated as follows: Given consecutive images $I_t: \Omega \to R$ from an image sequence, and given the segmentations $\alpha_{1:t-1}$ and transformations $\hat{\theta}_{1:t-1}$ obtained on the previous images $I_{1:t-1}$ the process maximizes the conditional probability $$P(\alpha_t, \theta_t | I_t, \alpha_{1:t-1}, \hat{\theta}_{1:t-1}) = \frac{P(I_t|\alpha_t, \theta_t)P(\alpha_t, \theta_t|\alpha_{1:t-1}, \hat{\theta}_{1:t-1})}{P(I_t|\alpha_{1:t-1}, \hat{\theta}_{1:t-1})}, \tag{11}$$

with respect to the shape parameters $\alpha_t$ and the transformation parameters $\theta_t$. The conditional probability is modeled as:

$$P(\alpha_t, \theta_t | \alpha_{1:t-1}, \hat{\theta}_{1:t-1}), \tag{12}$$

which constitutes the probability for observing a particular shape $\alpha_t$ and a particular transformation $\theta_t$ at time t, conditioned on the parameter estimates for shape and transformation obtained on previous images.

3. DYNAMICAL STATISTICAL SHAPE MODELS

Abundant theory has been developed to model temporally correlated time series data. Applications of dynamical systems to model deformable shapes were proposed among others in [A. Blake and M. Isard. *Active Contours*. Springer, London, 1998]. Here, the process learns dynamical models for implicitly represented shapes. To simplify the discussion, let us first focus on dynamical models of shape deformation. In other words, it is assumed that a uniform distribution on the transformation parameters and merely model the conditional distribution $P(\alpha_t|\alpha_{1:t-1})$.

3.1 Dynamical Models of Deformation

Referring again to FIG. 13, in Step 100, a hand-segmented image sequence of a deformable object having a sequentially changing, for example, oscillatory behavior is obtained in any conventional manner. More particularly, as described above in section 2.2, let $\{\phi_1,\ldots,\phi_N\}$ be a temporal sequence of training shapes. The result is shown for a walking person example in FIG. 1 showing black training shapes on white ground and level set functions for each shape. As described in section 2.2, let $\phi_0$ denote the mean shape and $\psi_1,\ldots,\psi_n$ the n largest eigenmodes with. n<<N In Step 102, the process computes the principal component, using PCA) representation of level set functions, this is called the shape vector as in equations (9) and (10) below. The PCA representation of the sequence of silhouettes is shown in the lower 6 training shapes here 6 silhouettes of FIG. 1. Note that the last one can observe that the in the last one of the 6 silhouettes in the upper set the right foot has a sharper toe than in the corresponding last one of the silhouettes in the last one of the lower 6 shapes because of the approximation in a PCA.

Thus, from the PCA, the process then approximate each training shape as: in equations (8) and (9) above.

Figure 2A:
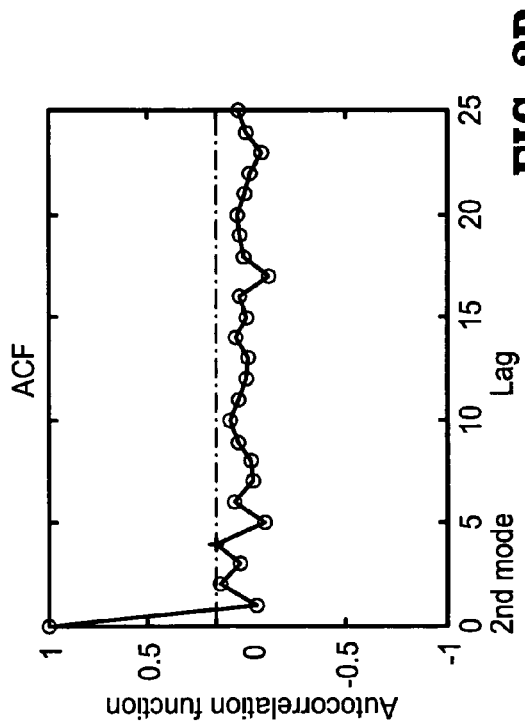
FIGS. 2A-2D, collectively hereinafter referred to as FIG. 2, are autocorrelation functions used to validate the autoregressive model according to the invention, the autocorrelation functions of residuals associated are plotted with the first four shape modes.
Figure 2B:
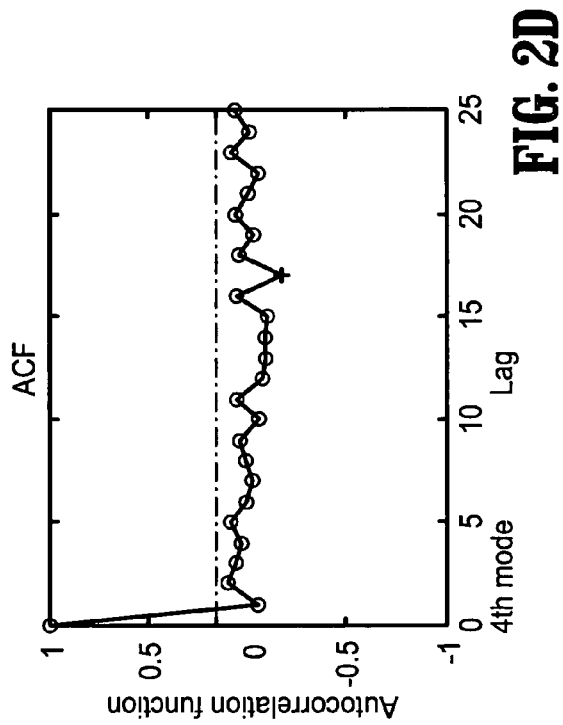
Figure 2C:
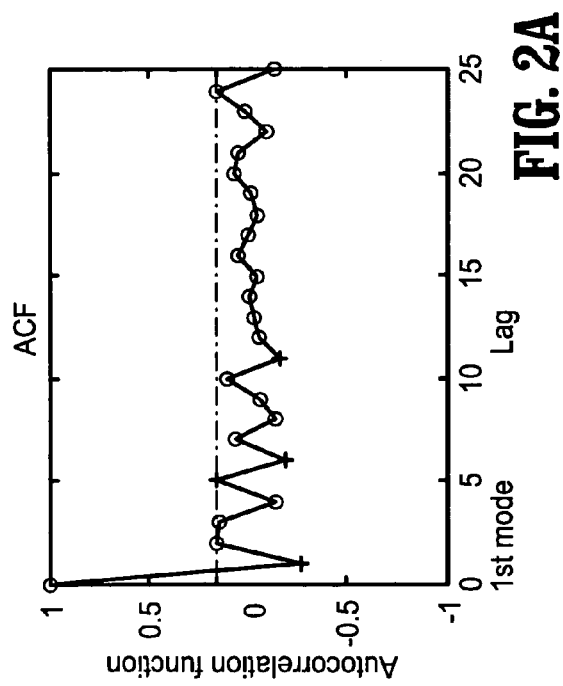
Figure 2D:
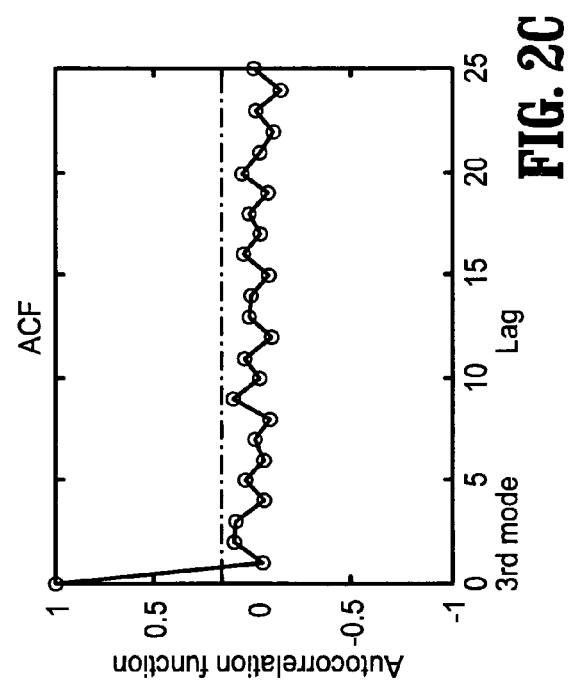
Figure 3B:
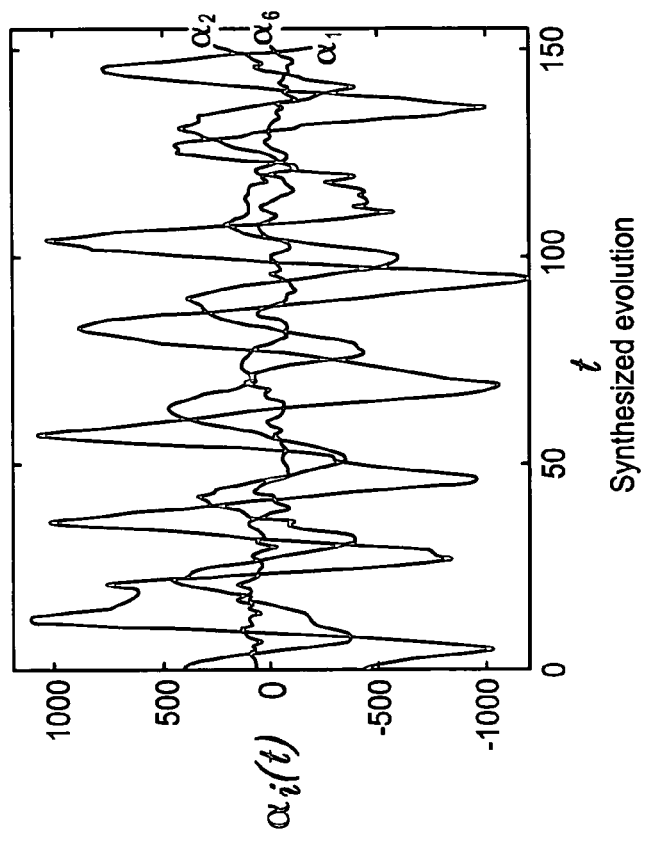
FIGS. 3A-3B, collectively hereinafter referred to as FIG. 3, are shape modes, the original shape sequence (left) and the sequence synthesized by a statistically learned second order Markov chain (right) according to the invention showing the temporal evolution of the first, second and sixth shape eigenmode.
Figure 3A:
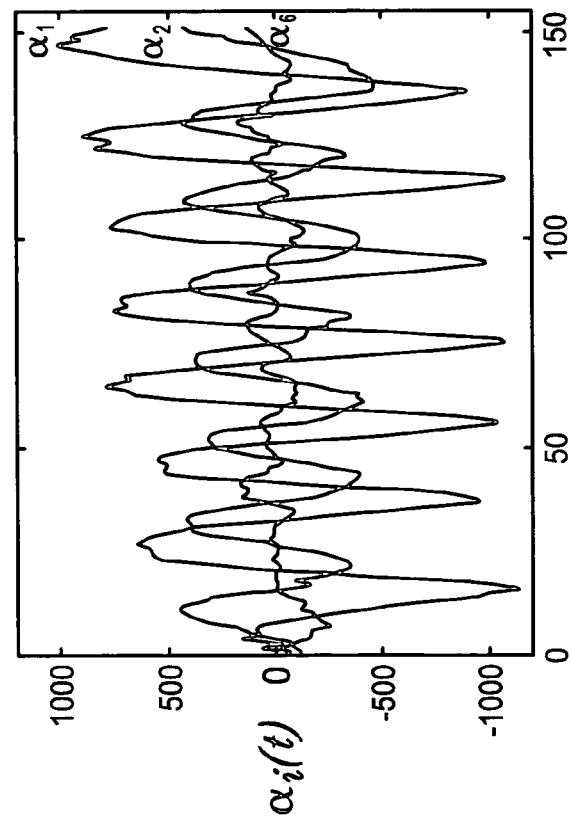
Figure 6A:
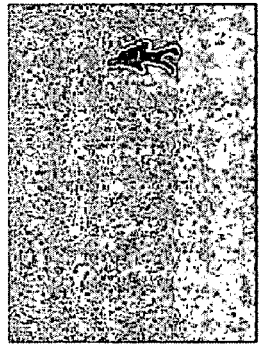
FIGS. 6A-6E, collectively hereinafter referred to as FIG. 6, shows segmentation according to the invention using a static shape prior for 25% noise.
Figure 6B:
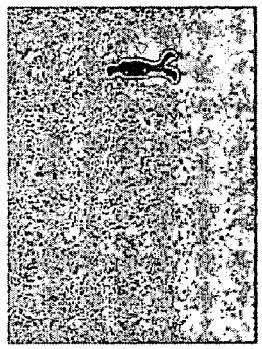
Figure 6C:
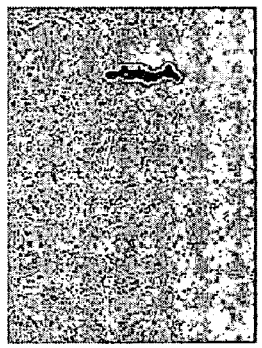
Figure 6D:
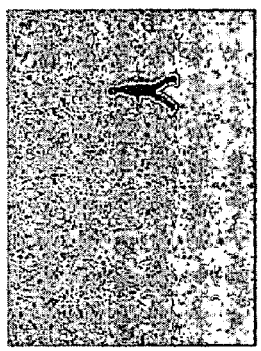
Figure 6E:
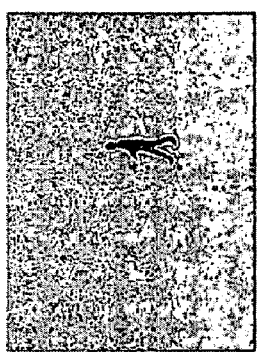
Figure 7A:
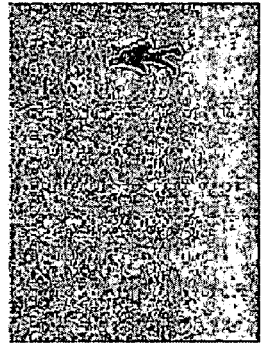
FIGS. 7A-7E, collectively hereinafter referred to as FIG. 6, shows segmentation according to the invention using a static shape prior for 50% noise.
Figure 7B:
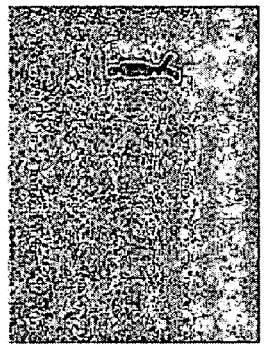
Figure 7C:
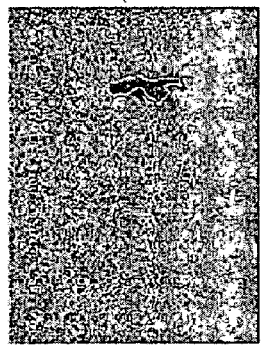
Figure 7D:
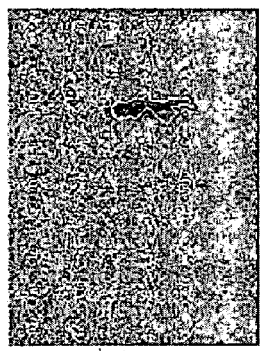
Figure 7E:
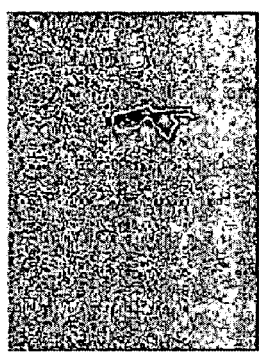
Figure 8A:
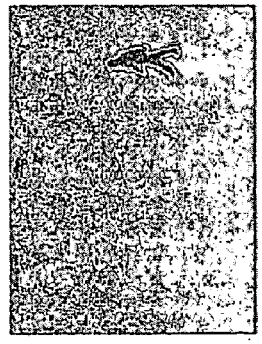
FIGS. 8A-8E, collectively hereinafter referred to as FIG. 8, shows segmentation according to the invention using a dynamical shape prior for 50% noise.
Figure 8B:
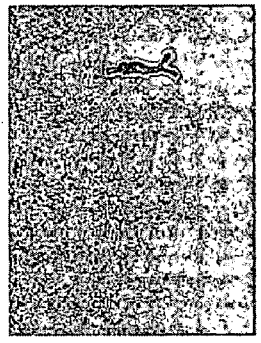
Figure 8C:
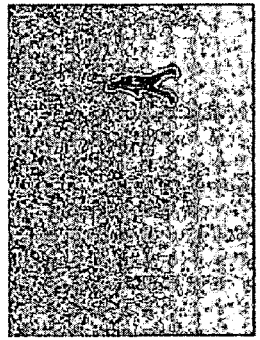
Figure 8D:
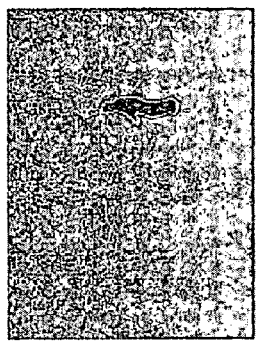
Figure 8E:
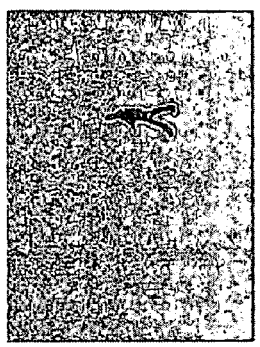
Figure 9A:
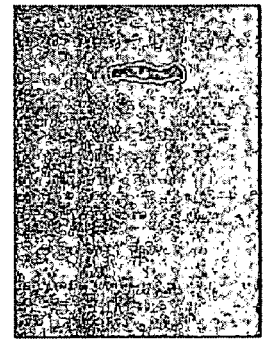
FIGS. 9A-9J, collectively hereinafter referred to as FIG. 9, shows tracking according to the invention with dynamical shaped prior for 75% of noise.
Figure 9B:
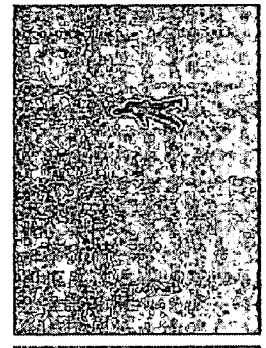
Figure 9C:
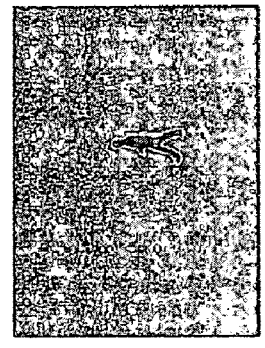
Figure 9D:
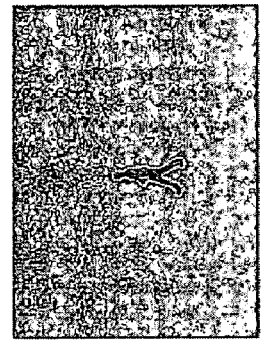
Figure 9E:
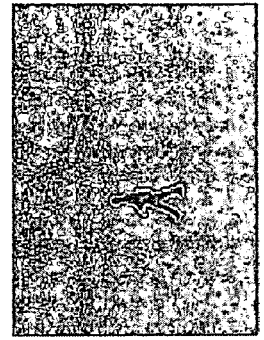
Figure 9F:
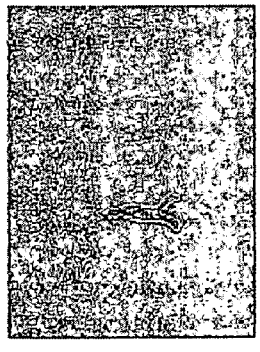
Figure 9G:
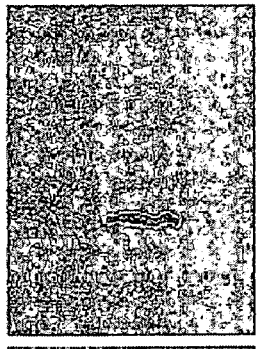
Figure 9H:
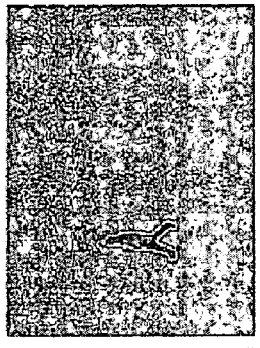
Figure 9I:
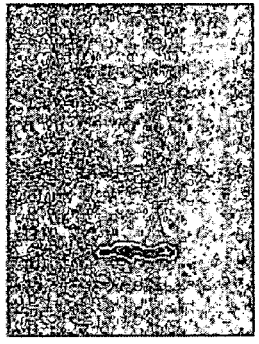
Figure 9J:
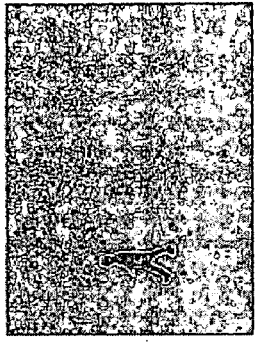

In Step 104, the process estimates a dynamical (autoregressive) model for the sequence of shape vectors. This is shown in equation (13) below. FIG. 3 shows the shape vectors of the input sequence (left) and of the sequence synthesized with the model (right). More particularly, FIG. 3 is a model comparison; the original shape sequence (top) and the sequence synthesized by a statistically learned second order Markov chain (bottom) exhibit similar oscillatory behavior and amplitude modulation. The plots show the temporal evolution of the first, second and sixth shape eigenmode.

FIG. 5 shows samples from an image sequence with increasing noise. FIG. 5 are images from a sequence with increasing amounts of noise, here a sample input frame from a sequence with 25%, 50%, and 90% noise, where 90% noise means that 90% of all pixels were replaced by a random intensity sampled from a uniform distribution develops a temporal statistical shape model of the oscillatory behavior of the embedding function representing the object, here the walking person, from prior motion.

Still more particularly, the process learns the temporal dynamics of a deforming shape by approximating the shape vectors $\alpha_t \equiv \alpha_{\phi_t}$ of a sequence of level set functions by a Markov chain ([Neumaier, Schneider 2001]) of order k, i.e.:

$$\alpha_t = \mu + A_1\alpha_{t-1} + A_2\alpha_{t-2} + \ldots + A_k\alpha_{t-k} + \eta, \tag{13}$$

where $\eta$ is zero-mean Gaussian noise with covariance $\Sigma$. The probability of a shape conditioned on the shapes observed in previous time steps is therefore given by the corresponding autoregressive model of order k:

$$P(\alpha_t|\alpha_{1:t-1}) \propto \exp\left(-\frac{1}{2}v^* \Sigma^{-1} v\right), \tag{14}$$

where $$v \equiv \alpha_t - \mu - A_1\alpha_{t-1} - A_2\alpha_{t-2}\ldots - A_k\alpha_{t-k} \tag{15}$$

Various methods have been proposed in the literature to estimate the model parameters given by the mean $\mu \in R^n$ and the transition and noise matrices $A_1, \ldots, A_k, \Sigma \in R^{n \times n}$. Here, the process applies a stepwise least squares algorithm proposed in [A. Neumaier and T. Schneider. Estimation of parameters and eigenmodes of multivariate autoregressive models. *ACM T. on Mathematical Software*, 27(1):27-57, 2001]. Different tests have been devised to quantify the accuracy of the model fit. Two established criteria for model accuracy are Akaike's Final Prediction Error see H. Akaike.

Autoregressive model fitting for control. *Ann. Inst. Statist. Math.*, 23:163-180, 1971 and Schwarz's Bayesian Criterion G. Schwarz. Estimating the dimension of a model. *Ann. Statist.*, 6:461-464, 1978. Using dynamical models up to an order of 8, it was found that according to Schwarz's Bayesian Criterion, the training sequences using the process were best approximated by an autoregressive model of second order.

From a training sequence of 151 consecutive silhouettes, the parameters of a second order autoregressive model are estimated. This model was subsequently evaluated by plotting the autocorrelation functions of the residuals associated with each of the modeled eigenmodes—see FIG. 2. These show that the residuals are essentially uncorrelated. Thus, with the autocorrelation functions shown in FIG. 2, one can validate the autoregressive model provided in Step 104 of FIG. 13, by plotting the autocorrelation functions of the residuals associated with the first four shapes modes. Clearly these residuals are statistically correlated.

In addition, the estimated model parameters allow the process to synthesize a walking sequence according to equation (13). To remove the dependency on the initial conditions, the first several hundred samples were discarded. FIG. 3 shows the temporal evolution of the first, second and sixth eigenmode in the input sequence (left) and in the synthesized sequence (right). Clearly, the second order model captures some of the key elements of the oscillatory behavior. The original shape sequence, left, and the sequence synthesized by a statistical learned second order Markov chain, right, in accordance with Step 104 (FIG. 13) exhibit similar oscillatory behavior and amplitude modulation. These plots show the temporal evolution of the first, second and sixth shape eigenmode. The original shape sequence (left) and the sequence synthesized by a statistically learned second order Markov chain (right) exhibit similar oscillatory behavior and amplitude modulation. The plots show the temporal evolution of the first, second and sixth shape eigenmode.

While the synthesized sequence does capture the characteristic motion of a walking person, FIG. 4 shows that the individual synthesized silhouettes do not in all instances mimic valid shapes. It is believes that such limitations can be expected from a model which strongly compresses the represented input sequence: Instead of 151 shapes defined on a 256×256 grid, the model merely retains a mean shape $\phi_0$, 6 eigenmodes $\psi$ and the autoregressive model parameters given by a 6-dimensional mean and three 6×6 matrices. This amounts to 458851 instead of 9895936 parameters, corresponding to a compression to 4.6% of the original size. While the synthesis of dynamical shape models using autoregressive models has been studied before [A. Blake and M. Isard. *Active Contours*, Springer, London, 1998], it should be noted that the synthesizing of the shapes is based on an implicit representation. More particularly, FIG. 4 shows synthetically generated walking sequence produced by the process. The sample silhouettes are generated by the statistically learned second order Markov model on the embedding functions-see equation (13). While the Markov model captures much of the typical oscillatory behavior of a walking person, not all generated simples corresponds to permissible shapes—cf. the last two silhouettes on the bottom right. Yet as described in section 5 bellow the model is sufficiently accurate to appropriately constrain a segment process. FIG. 4 show synthetically generated walking sequence by the process. Sample silhouettes generated by a statistically learned second order Markov model on the embedding functions—see equation (13). While the Markov model captures much of the typical oscillatory behavior of a walking person, not all generated samples correspond to permissible shapes—cf. the last two silhouettes on the bottom right. Yet, as will be described in Section 5, the model is sufficiently accurate to appropriately constrain a segmentation process.

Referring to FIG. 14, a sequence of statistically synthesized embedding functions is shown and the induced contours given by the zero level line of the respective surfaces are also shown. In particular, this implicit representation allows to synthesize shapes of varying topology. The silhouette on the bottom left of FIG. 14 for example, consists of two contours. The sequence are statistically generated embedding surfaces obtained by sampling from a second order autoregressive model, and the contours given by the zero level lines of the synthesized surfaces. The implicit formulation allows the embedded contour to change topology (bottom left image).

3.2 Joint Dynamics of Deformation and Transformation

In the previous section, autoregressive models were introduced to capture the temporal dynamics of implicitly represented shapes. To this end, the degrees of freedom corresponding to transformations such as translation and rotation were removed before performing the learning of dynamical models. As a consequence, the learning only incorporates deformation modes, neglecting all information about pose and location. The synthesized shapes in FIG. 4, for example, show a walking person which is walking "on the spot".

In general, one can expect the deformation parameters $\alpha_t$ and the transformation parameters $\theta_t$ to be tightly coupled. A model which captures the joint dynamics of shape and transformation would clearly be more powerful than one which neglects the transformations. Yet, the process learns dynamical shape models which are invariant to translation, rotation and other transformations. To this end, one can make use of the fact that the transformations form a group which implies that the transformation $\theta_t$ at time t can be obtained from the previous transformation $\theta_{t-1}$ by applying an incremental transformation •$\theta_t$: $T_{\theta_t} x = T_{\Box \theta_t} T_{\theta_{t-1}} x$. Instead of learning models of the absolute transformation $\theta_t$, the process simply learns models of the update transformations •$\theta_t$ (e.g. the changes in translation and rotation). By construction, such models are invariant with respect to the global pose or location of the modeled shape.

To jointly model transformation and deformation, the process simply obtains for each training shape in the learning sequence the deformation parameters $\alpha_t$ and the transformation changes •$\theta_t$, and fit the autoregressive models given in equations (14) and (15) to the combined vector $$\alpha_t = \begin{pmatrix} \alpha_t \\ \Delta\theta_t \end{pmatrix}. \tag{16}$$

In the case of the walking person, it was found that—as in the stationary case—a second order autoregressive model gives the best model fit. Synthesizing from this model allows to generate silhouettes of a walking person which are similar to the ones shown in FIG. 4, but which move forward in space, starting from an arbitrary (user-specified) initial position.

4. DYNAMICAL SHAPE PRIORS IN VARIATIONAL SEGMENTATION

Given an image $I_t$ from an image sequence and given a set of previously segmented shapes with shape parameters $\alpha_{1:t-1}$ and transformation parameters $\theta_{1:t-1}$, the goal of tracking is to maximize the conditional probability equation (11) with respect to shape $\alpha_t$ and transformation $\theta_t$. This can be performed by minimizing its negative logarithm, which is—up to a constant—given by an energy of the form:

$$E(\alpha_t, \theta_t) = E_{data}(\alpha_t, \theta_t) + \nu E_{shape}(\alpha_t, \theta_t). \quad (17)$$

The additional weight $\nu$ was introduced to allow a relative weighting between prior and data term. In particular if the intensity information is not consistent with the assumptions (Gaussian intensity distributions of object and background), a larger weight of $\nu$ is preferable. The data term is given by:

$$E_{data}(\alpha_t, \theta_t) = \int_\Omega \left( \frac{(I_t - \mu_1)^2}{2\sigma_1^2} + \log\sigma_1 \right) H\phi_{\alpha_t, \theta_t} + \left( \frac{(I_t - \mu_2)^2}{2\sigma_2^2} + \log\sigma_2 \right)(1 - H\phi_{\alpha_t, \theta_t}) dx, \quad (18)$$

where, for notational simplicity, the expression below is introduced $$\phi_{\alpha_t, \theta_t} \equiv \phi_0(T_{\theta_t} x) + \alpha_t \cdot \psi(T_{\theta_t} x), \quad (19)$$

to denote the embedding function of a shape generated with deformation parameters $\alpha_t$ and transformed with parameters $\theta_t$.

Using the autoregressive model equation (14), the shape energy is given by:

$$E_{shape}(\alpha_t, \theta_t) = \frac{1}{2} v^* \sum\nolimits^{-1} v \quad (20)$$

with $v$ defined in equation (15). To incorporate the joint model of deformation and transformation introduced in Section 1, the above expression for $v$ needs to be enhanced by the relative transformations $\cdot \theta_t$:

$$v \equiv \begin{pmatrix} \alpha_t \\ \Delta\theta_t \end{pmatrix} - \mu - A_1 \begin{pmatrix} \alpha_{t-1} \\ \Delta\theta_{t-1} \end{pmatrix} - A_2 \begin{pmatrix} \alpha_{t-2} \\ \Delta\theta_{t-2} \end{pmatrix} \ldots - A_k \begin{pmatrix} \alpha_{t-k} \\ \Delta\theta_{t-k} \end{pmatrix}, \quad (21)$$

where $\mu$ and $A_i$ denote the statistically learned mean and transition matrices for the joint space of deformations and transformations, and k is the model order. In experiments, a model order of k=2 was selected.

One can easily show that a second order autoregressive model can be interpreted as a stochastic version of a time-discrete damped harmonic oscillator. As a consequence, it is well suited to model essentially oscillatory shape deformations. However, it was found that higher-order autoregressive models provide qualitatively similar results.

Compute optimal segmentation of test sequence which is consistent with the learned dynamical model. This is done by finding the shape vector which maximizes the conditional probability in equation (11). Maximization is implemented by performing gradient descent on the negative logarithm of this probability. This is shown in equation (22). Intuitively this process deforms the shape such that it matches best, both with the current image and with the prediction of the dynamical model. The optimal shape for each test image is shown in FIGS. 9, 10, 11, and 13.

Tracking an object of interest over a sequence of images $I_{1:t}$ with a dynamical shape prior can be done by minimizing energy equation (17). A gradient descent strategy was used, leading to the following differential equations to estimate the shape vector $\alpha_t$:

$$\frac{d\alpha_t(\tau)}{d\tau} = -\frac{\partial E_{data}(\alpha_t, \theta_t)}{\partial \alpha_t} - \nu \frac{\partial E_{shape}(\alpha_t, \theta_t)}{\partial \alpha_t} \quad (22)$$

where $\tau$ denotes the artificial evolution time, as opposed to the physical time t. The data term is given by:

$$\frac{\partial E_{data}}{\partial \alpha_t} = \left\langle \psi, \delta(\phi\alpha_t) \left( \frac{(I_t - \mu_1)^2}{2\sigma_1^2} - \frac{(I_t - \mu_2)^2}{2\sigma_2^2} + \log\frac{\sigma_1}{\sigma_2} \right) \right\rangle,$$

and the shape term is given by:

$$\frac{\partial E_{shape}}{\partial \alpha_t} = \frac{\partial v}{\partial \alpha_t} \Sigma^{-1} v = \begin{pmatrix} 1_n & 0 \\ 0 & 0 \end{pmatrix} \Sigma^{-1} v, \quad (23)$$

with $v$ given in equation (21) and $1_n$ being the n-dimensional unit matrix modeling the projection on the shape components of $v$, where n is the number of shape modes. These two terms affect the shape evolution in the following manner: The first term draws the shape to separate the image intensities according to the two Gaussian intensity models. Since variations in the shape vector $\alpha_t$ affect the shape through the eigenmodes $\psi$, the data term is a projection onto these eigenmodes. The second term induces a relaxation of the shape vector $\alpha_t$ toward the most likely shape, as predicted by the dynamical model based on the shape vectors and transformation parameters obtained for previous time frames.

Similarly, minimization with respect to the transformation parameters $\theta_t$ is obtained by evolving the respective gradient descent equation given by:

$$\frac{d\theta_t(\tau)}{d\tau} = -\frac{\partial E_{data}(\alpha_t, \theta_t)}{\partial \theta_t} - \nu \frac{\partial E_{shape}(\alpha_t, \theta_t)}{\partial \theta_t} \quad (24)$$

where the data term is given by $$\frac{\partial E_{data}(\alpha_t, \theta_t)}{\partial \theta_t} = \left\langle \nabla\psi \frac{d(T_{\theta_t} x)}{d\theta_t}, \delta(\phi\alpha_t) \left( \frac{(I_t - \mu_1)^2}{2\sigma_1^2} - \frac{(I_t - \mu_2)^2}{2\sigma_2^2} + \log\frac{\sigma_1}{\sigma_2} \right) \right\rangle, \quad (25)$$

and the driving term from the prior is given by:

$$\frac{\partial E_{shape}}{\partial \theta_t} = \frac{\partial v}{\partial \theta_t} \Sigma^{-1} v = \frac{d(\Delta\theta_t)}{d\theta_t} \begin{pmatrix} 0 & 0 \\ 0 & 1_s \end{pmatrix} \Sigma^{-1} v, \quad (26)$$

where, as above, the shape prior contributes a driving force toward the most likely transformation predicted by the dynamical model. The block diagonal matrix in equation (11) simply models the projection onto the s transformation components of the joint vector v defined in equation (21).

5. EXPERIMENTAL RESULTS

5.1. Dynamical Versus Static Statistical Shape Priors

In the following, dynamical statistical shape prior introduced above for the purpose of level set based tracking will be introduced.

To construct the shape prior, in accordance with the process, and as noted in Step 100 of FIG. 13, hand-segmentation of, in this example, a sequence of a walking person, centered and binarized each shape is obtained. Subsequently, the process determines the set of signed distance functions $\{\phi_i\}_{i=1...N}$ associated with each shape and computed the dominant 6 eigenmodes, Step 102 in FIG. 13. Projecting each training shape onto these eigenmodes, the process obtains in Step 104, a sequence of shape vectors $\{\alpha_i \in R^6\}_{i=1...N}$. The process fits a second order multivariate autoregressive model to this sequence by computing the mean vector $\mu$, the transition matrices $A_1, A_2 \in R^{6 \times 6}$ and the noise covariance $\Sigma \in R^{6 \times 6}$ shown in equation (14). Subsequently, the process compares segmentations of noisy sequences obtained by segmentation in the 6-dimensional subspace without and with the dynamical statistical shape prior.

The segmentation without dynamical prior corresponds to that obtained with a static uniform prior in the subspace of the first few eigenmodes, as proposed in A. Tsai, A. Yezzi, W. Wells, C. Tempany, D. Tucker, A. Fan, E. Grimson, and A. Willsky. Model-based curve evolution technique for image segmentation. In *Comp. Vision Patt. Recog.*, pages 463-468, Kauai, Hawaii, 2001. While there exist alternative models for static shape priors (for example the Gaussian model M. Leventon, W. Grimson, and O. Faugeras. Statistical shape influence in geodesic active contours. In *CVPR*, volume 1, pages 316-323, Hilton Head Island, S.C., 2000 or non-parametric statistical models D. Cremers, S. J. Osher, and S. Soatto. Kernel density estimation and intrinsic alignment for knowledge-driven segmentation: Teaching level sets to walk. In *Pattern Recognition*, volume 3175 of *LNCS*, pages 36-44. Springer, 2004 and M. Rousson and D. Cremers [*MICCAI*, volume 1, pages 757-764], it was found in experiments that all of these exhibit a qualitatively similar limitation when applied to image sequence segmentation (see FIG. 7) they tend to get stuck in local minima because they do not exploit temporal shape correlations.

In Step 108, the process then applies the model against future, sequential motion of the object in the presence of unwanted phenomena by maximizing the probability that the developed statistical shape model matches the sequential motion of the object in the presence of unwanted phenomena.

Thus, referring to FIG. 5, a sample input frame from a sequence with 25%, 50%, 75% and 90% noise is shown. (It is noted that noise means that 25% of all pixels were replaced by a random intensity sampled from a uniform distribution. It is interesting to note that our algorithm easily handles uniform noise, although its probabilistic formulation is based on the assumption of Gaussian noise.) FIG. 6 shows a set of segmentations obtained with a uniform static shape prior on a sequence with 25% noise. FIG. 6 shows a Segmentation using a static shape prior for 25% noise. Constraining the level set evolution to a low-dimensional subspace allows to cope with a certain amount of noise. While this segmentation without dynamical prior is successful in the presence of moderate noise, FIG. 7 shows that the segmentation without dynamical prior eventually breaks down when the noise level is increased. FIG. 7 shows segmentation using a static shape prior for 50\% noise. Using a static (uniform) shape prior, the segmentation scheme cannot cope with larger amounts of noise. It gets stuck in a local minimum after the first few frames. Since static shape priors do not provide for predictions in time, they have a tendency of getting stuck to the shape estimate obtained on the previous image. More particularly, FIG. 6 shows segmentations with a static shape prior on a walking sequence with 25% noise. Constraining the level set evolution to a low-dimensional subspace allows to cope with a certain amount of noise and FIG. 7 shows segmentations with a static shape prior on a walking sequence with 50% noise. Using merely a static shape prior, the segmentation scheme cannot cope with larger amounts of noise.

FIG. 8 shows segmentations of the same sequence as in FIG. 7 obtained with a dynamical statistical shape prior derived from a second order autoregressive model. FIG. 8 shows segmentation using a dynamical shape prior for 50% noise. In contrast to the segmentation with a static prior shown in FIG. 7, the dynamical prior (using a second-order autoregressive model) imposes statistically learned information about the temporal dynamics of the shape evolution to cope with missing or misleading low-level information.

FIGS. 9 and 10 show that the statistical shape prior provides for good segmentations, even with 90% noise. Clearly, exploiting the temporal statistics of dynamical shapes allows to make the segmentation process very robust to missing and misleading information. More particularly, FIG. 8 shows segmentation using a dynamical statistical shape prior based on a second order autoregressive model. In contrast to the segmentation in FIG. 7, the prior imposes statistically learned information about the temporal dynamics of the shape evolution to cope with misleading low-level information and FIG. 9 shows tracking with dynamical statistical shape prior to cope with larger amounts of noise. The input images were corrupted with 90% of noise. Yet, the statistically learned dynamical shape model allows to disambiguate the low-level information. These experiments confirm that the tracking schemes can indeed compete with the capacities of human observers. FIG. 9 shows tracking with dynamical shaped prior for 75% of noise. The statistical learned dynamical shaped model allows to disambiguate the low level information. FIG. 10 shows tracking with dynamical shape prior for 90\% of noise. Quantitative evaluation with respect to the ground truth, shown in FIG. 11, left side, indicates that our tracking scheme can indeed compete with the capacities of human observers, providing reliable segmentations where human observers fail. The segmentation results on the first few frames are inaccurate, since the segmentation process with a dynamical shape prior accumulates image information (and memory) over time.

5.2. Quantitative Evaluation of the Noise Robustness

In order to quantify the accuracy of segmentation, hand segmentations of the original test sequence were used. Subsequently, the following error measure was defined:

$$\varepsilon = \frac{\int (H\phi(x) - H\phi_0(x))^2 dx}{\int H\phi(x) dx + \int H\phi_0(x) dx}, \tag{27}$$

where H is again the Heaviside step function, $\phi_0$ is the true segmentation and $\phi$ the estimated one. This error corresponds to the relative area of the set symmetric difference, i.e. the union of both segmentations minus its intersection, divided by the areas of each segmentation. While there exist numerous measures of segmentation accuracy, it was decided for this measure, because it takes on values within the well-defined range $0 \leq \epsilon \leq 1$, where $\epsilon=0$ corresponds to the perfect segmentation.

FIG. 11, left side, shows the segmentation error averaged over a test sequence as a function of the noise level. A dynamical shape prior of deformation and transformation (Section 3.3) were used, initializing the segmentation process with an estimate of the initial location. The plot shows several things: Firstly, the error remains fairly constant for noise levels below 60%. This is due to the fact that the weight v of the prior is set to a fixed value for all experiments (ideally one would use smaller weights for less noise). Therefore, the residual error of around 5% stems from the discrepancy between the estimated dynamical model and the true sequence, accumulating errors introduced by the principal component approximation and the approximation by autoregressive models. Secondly, as can be expected, the error increases for larger values of noise. The deviation from monotonicity (in particular at 90% noise) is probably an effect of statistical fluctuation. The initial pose estimate in conjunction with prior knowledge about the translational component of walking leads to the fact that the error is below that of a random segmentation even in the case of 100% noise. FIG. 11 shows quantitative evaluation of the segmentation accuracy. The relative segmentation error is plotted for increasing amounts of noise (left) and for varying walking speed (right). Even for 100% noise the segmentation error remains well below 1 because the process integrates a good estimate of the initial position and a model of the translational motion. The plot on the right shows that for walking speeds v slower than the learned one $v_0$, the segmentation error (with 70% noise) remains low, whereas for faster walking sequences, the accuracy slowly degrades. Yet, even for sequences of 5 times the learned walking speed, segmentation with a dynamical prior outperforms the segmentation with a static prior.

5.3. Robustness to Variations in Frequency and Frame Rate

The dynamical shape prior introduces a prior knowledge about how likely certain silhouettes are, given the segmentations obtained on the last few frames. Let us assume that the process has learned a dynamical model of a walking person from a sequence of a fixed walking speed $v_0$. Clearly, the estimated model will be tuned to this specific walking speed. Yet, when applying such a model in practice, one cannot guarantee that the person in the test sequence will be walking at exactly the same speed. Equivalently, one may not be sure—even if the walking speed is identical—that the camera frame rate is the same. In order to be practically useful, the proposed prior must be robust to variations in the walking frequency and frame rate.

To validate this robustness, test sequences of different walking speed by either dropping certain frames were synthesized (in order to speed up the gait) or by replicating frames (thereby slowing down the gait). FIG. 11, right side, shows the segmentation error $\epsilon$, defined in equation (27), averaged over test sequences with 70% noise and speeds which vary from ⅕ the speed of the training sequence to 5 times the original speed. While the accuracy is not affected by slowing down the sequence, it degrades gradually once the speed is increased. Yet, the segmentation process is quite robust to such drastic changes in speed. The reason for this robustness is twofold: Firstly, the Bayesian formulation allows to combine model prediction and input data in a way that the segmentation process constantly adapts to the incoming input data. Secondly, the autoregressive model only relies on the last few estimated silhouettes to generate a shape probability for the current frame. It does not assume long range temporal consistency and can thus handle sequences with varying walking speed. The experiments show that even for sequences of 5 times the original walking sequence segmentation with a dynamical model is superior to segmentation with a static model. This is not surprising: In contrast to the static model, the dynamical model does provide a prediction of the temporal shape evolution. Even if this prediction may be sub-optimal for strongly differing walking speeds, it still allows to enhance the segmentation process.

5.4. Joint Dynamics of Deformation and Transformation

In Section 3.2, dynamical models were introduced to capture the joint evolution of deformation and transformation parameters. On the tasks shown so far, pure deformation models and joint models of deformation and transformation were found to provide similar segmentation results. While the joint model provides a prior about the transformation parameters which are most likely at a given time instance, the pure-deformation model requires these parameters to be estimated solely from the data.

Figures 12A, 12B, 12C, 12D, 12E:
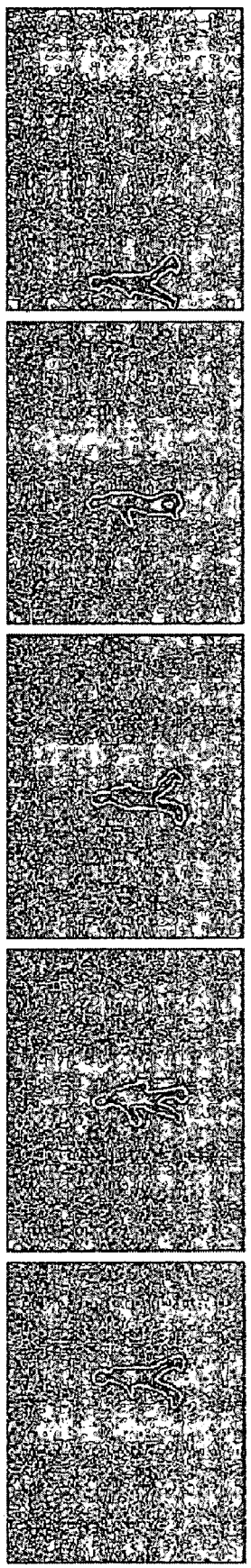
FIGS. 12A-12J, collectively hereinafter referred to as FIG. 12, shows tracking in the presence of occlusion according to the invention.
Figures 12F, 12G, 12H, 12I, 12J:
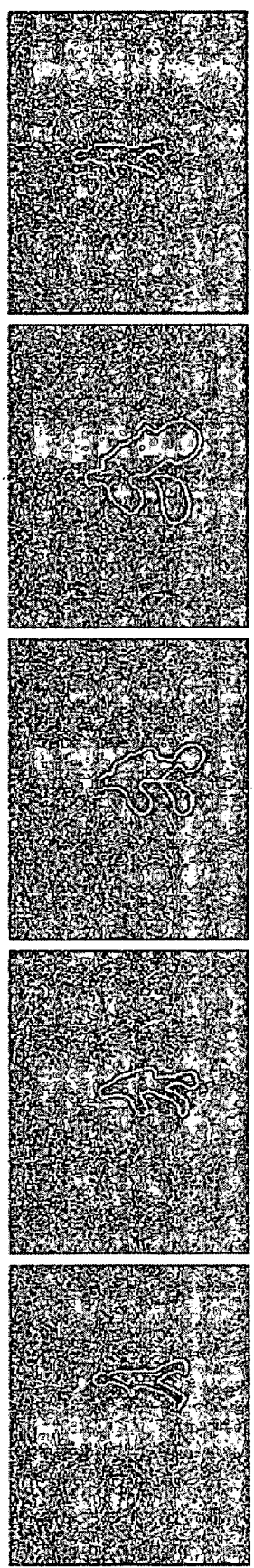

As a final example, a segmentation task is generated where the transformation parameters cannot be reliably estimated from the data due to a prominent occlusion. The test sequence shows a person walking from right to left and an occluding bar moving from left to right, corrupted by 80% noise. FIG. 12, top row, shows segmentations obtained with a dynamical shape prior capturing both deformation and transformation. Even when the walking silhouette is completely occluded, the model is capable of generating silhouettes walking to the left and adapts to the image data, once the figure reappears.

The bottom row of FIG. 12, on the other hand, shows the segmentation of the same frames with a dynamical model which only incorporates the shape deformation. Since no knowledge about translation is assumed, the segmentation process needs to rely entirely on the image information in order to estimate the transformation parameters. As a consequence, the segmentation process is mislead by the prominent occlusion. When the figure reappears from behind the bar, the process integrates contradictory information about translation provided by the person walking to the left and by the bar moving to the right. Once the figure of interest is lost, the prior simply "hallucinates" silhouettes of a person walking "on the spot"—see the last image on the bottom right. Although a "failed" experiment, it is believed that this result illuminates best how the dynamical model and the image information are fused within the Bayesian formulation for image sequence segmentation. FIG. 12 shows tracking in the presence of occlusion. The input sequence shows a person walking to the left occluded by a bar moving to the right. While the top row is generated with a dynamical prior integrating both deformation and transformation, the bottom row uses a dynamical prior which merely captures the deformation component. Since the latter does not provide predictions of the translational motion, the estimation of translation is purely based on the image data. It is mislead by the occlusion and cannot recover, once the person reappears from behind the bar.

6. CONCLUSION

With the process described above, dynamical statistical shape models are used for implicitly represented shapes. In contrast to existing shape models for implicit shapes, these models capture the temporal correlations which characterize deforming shapes such as the consecutive silhouettes of a walking person. Such dynamical shape models account for the fact that the probability of observing a particular shape at a given time instance may depend on the shapes observed at previous time instances.

For the construction of statistical shape models, the process extended the concepts of Markov chains and autoregressive models to the domain of implicitly represented shapes. The resulting dynamical shape models therefore allow to handle shapes of varying topology. Moreover, they are easily extended to higher-dimensional shapes (i.e. surfaces).

The estimated dynamical models allow to synthesize shape sequences of arbitrary length. For the case of a walking person, the accuracy of the estimated dynamical models was validated, comparing the dynamical shape evolution of the input sequence to that of synthesized sequences for various shape eigenmodes, and verifying that the residuals are statistically uncorrelated. Although the synthesized shapes do not in all instances correspond to valid shapes, one can nevertheless use the dynamical model to constrain a segmentation and tracking process in such a way that it favors familiar shape evolutions.

To this end, a Bayesian formulation was developed for level set based image sequence segmentation, which allows to impose the statistically learned dynamical models as a shape prior for segmentation processes. In contrast to most existing approaches to tracking, autoregressive models are integrated as statistical priors in a variational approach which can be minimized by local gradient descent (rather than by stochastic optimization methods).

Experimental results confirm that the dynamical shape priors outperform static shape priors when tracking a walking person in the presence of large amounts of noise. Quantitative evaluation of the segmentation accuracy as a function of noise as provided. Moreover, the model-based segmentation process was found to be quite robust to large (up to a factor of 5) variations in frame rate and walking speed. Further, a dynamical prior in the joint space of deformation and transformation was shown to outperform a purely deformation-based prior, when tracking a walking person through prominent occlusions.

A number of embodiments of the invention have been described. Nevertheless, it will be understood that various modifications may be made without departing from the spirit and scope of the invention. Accordingly, other embodiments are within the scope of the following claims.

What is claimed is:

1. A method for detecting and tracking a deformable object having a sequentially changing behavior, comprising:
   using imaging apparatus to perform the steps of:
      developing a temporal statistical shape model of the sequentially changing behavior of an embedding function representing the object from prior motion, comprising:
      developing a hand segmented image sequence showing training of the object and level set functions for each one of the shapes;
      computing a sequence of shape vectors comprising principal component representations of the level set functions;
      estimating a dynamical model of for the sequence of shape vectors; and
      determining the one of the sequence of shape vectors having the maximum probability of matching the dynamical model; and
   wherein the estimating of the dynamical model comprises approximating the shape vectors $\alpha_t \equiv \alpha_{\varphi_t}$ of the sequence of level set functions by a Markov chain of order k, in accordance with $\alpha_t = \mu + A_1 \alpha_{t-1} + A_2 \alpha_{t-2} + \ldots + A_k \alpha_{t-k} + \eta$, where $\eta$ is zero-mean Gaussian noise with covariance $\Sigma$.

2. A method for detecting and tracking a deformable object having a sequentially changing behavior, comprising:
   using imaging apparatus to perform the steps of:
      developing a temporal statistical shape model of the sequentially changing behavior of an embedding function representing the object from prior motion, comprising:
      developing a hand-segmented image sequence showing training shapes of the object and level set functions for each one of the shapes;
      computing a sequence of shape vectors comprising principal component representations of the level set functions;
      estimating a dynamical model of for the sequence of shape vectors; and
      determining the one of the sequence of shape vectors having the maximum probability of matching the dynamical model and wherein the maximum probability determining comprises performing gradient descent on the negative logarithm of the conditional probability; and
      wherein given consecutive images $I_t: \Omega \to R$ from an image sequence, and given the segmentations $\alpha_{1:t-1}$ and transformations $\hat{\theta}_{1:t-1}$ obtained on the previous images $I_{1:t-1}$, the maximum probability determining comprises: maximizes a conditional probability $$P(\alpha_t, \theta_t | I_t, \alpha_{1:t-1}, \hat{\theta}_{1:t-1}) = \frac{P(I_t | \alpha_t, \theta_t) P(\alpha_t, \theta_t | \alpha_{1:t-1}, \hat{\theta}_{1:t-1})}{P(I_t | \alpha_{1:t-1}, \hat{\theta}_{1:t-1})}, \quad (11)$$

with respect to the shape vectors $\alpha_t$ and transformation parameters $\theta_t$;
   wherein the conditional probability is modeled as:

$$P(\alpha_t, \theta_t | \alpha_{1:t-1}, \hat{\theta}_{1:t-1}), \quad (12)$$

which constitutes the probability for observing a particular shape $\alpha_t$ and a particular transformation $\theta_t$ at time t, conditioned on the parameter estimates for shape and transformation obtained on previous images.

3. A method for detecting and tracking a deformable object having a sequentially changing behavior, comprising:
   using imaging apparatus to perform the step of:
      developing a temporal statistical shape model of the sequentially changing behavior of an embedding function representing the object from prior motion, comprising:
      developing a hand-segmented image sequence showing training shapes of the object and level set functions for each one of the shapes;
      computing a sequence of shape vectors comprising principal component representations of the level set functions;

estimating a dynamical model of for the sequence of shape vectors; and determining the one of the sequence of shape vectors having the maximum probability of matching the dynamical model and wherein the maximum probability determining comprises performing gradient descent on the negative logarithm of the conditional probability; and wherein the performing of the gradient descent on the negative logarithm of the conditional probability comprises using a gradient descent strategy, leading to the following differential equations to estimate the shape vector $\alpha_t$:

$$\frac{d\alpha_t(\tau)}{d\tau} = -\frac{\partial E_{data}(\alpha_t, \theta_t)}{\partial \alpha_t} - \nu\frac{\partial E_{shape}(\alpha_t, \theta_t)}{\partial \alpha_t} \qquad (22)$$

where $\tau$ denotes the artificial evolution time, as opposed to the physical time t.

* * * * *